F. E. FANNING.
STORAGE BATTERY CHARGING SYSTEM.
APPLICATION FILED MAY 23, 1913.
1,144,354.
Patented June 29, 1915.
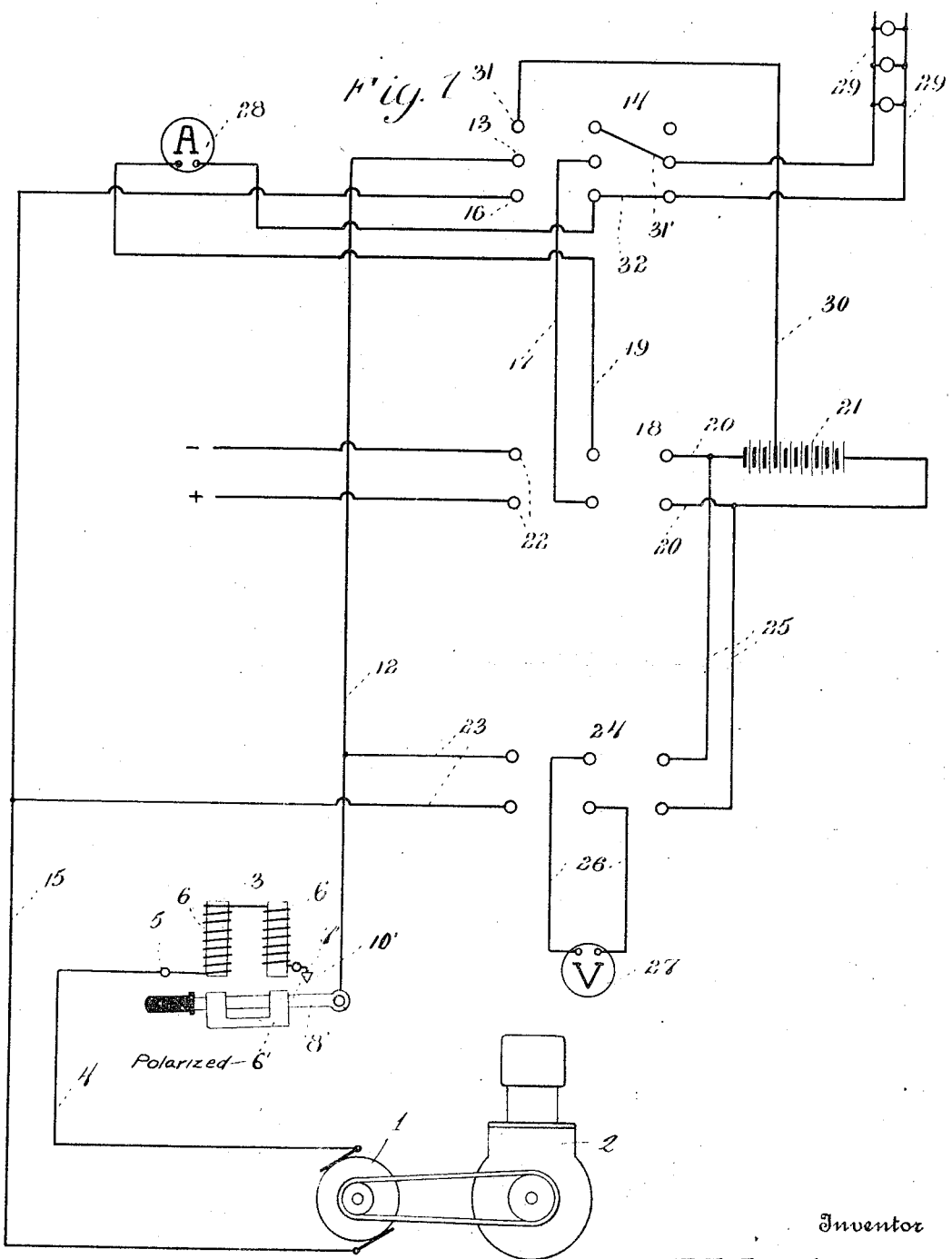

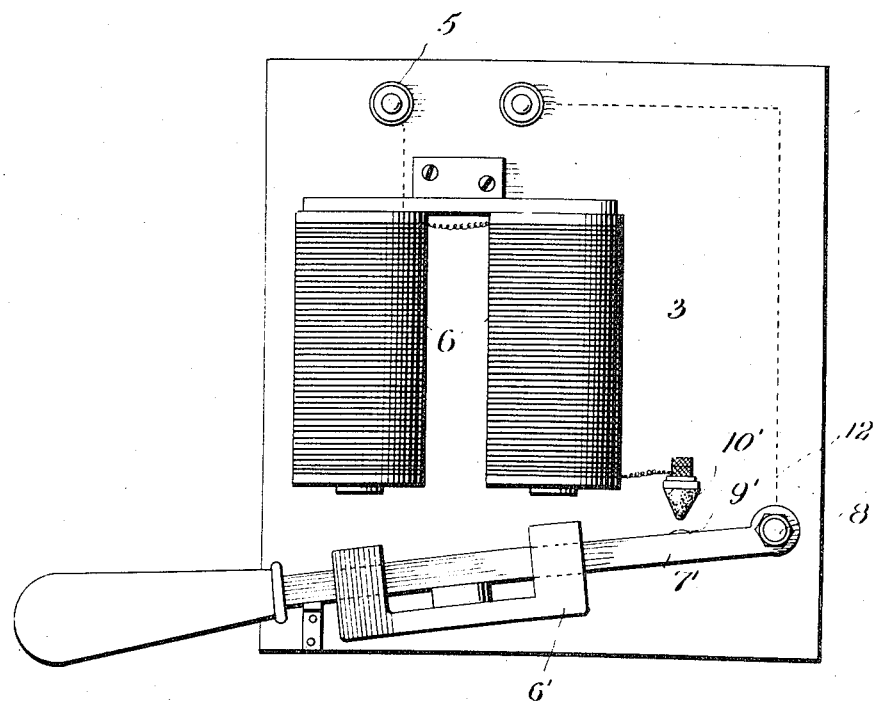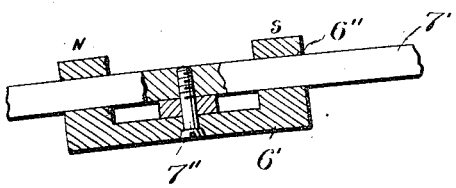

UNITED STATES PATENT OFFICE.

FRED E. FANNING, OF WOODLAND, ILLINOIS.

STORAGE-BATTERY-CHARGING SYSTEM.

1,144,354.  Specification of Letters Patent.  Patented June 29, 1915.

Application filed May 23, 1913. Serial No. 769,486.

*To all whom it may concern:*

Be it known that I, FRED E. FANNING, a citizen of the United States of America, residing at Woodland, in the county of Iroquois and State of Illinois, have invented new and useful Improvements in Storage-Battery-Charging Systems, of which the following is a specification.

This invention relates to improvements in charging systems for storage batteries or accumulators and has particular application to a charging system for use on motor vehicles, and in rural districts where the inhabitants have their own electric lighting plants.

In carrying out the present invention, it is my purpose to provide a system of the class described wherein by means of a generator adapted to be driven from an explosive engine, a storage battery or accumulator, and a number of switches, a lighting circuit may be fed from the accumulator and, when the latter has been exhausted, from the generator, the switches being capable of manipulation so that the lamp feeders may be placed in circuit with either the battery or the generator, and the generator converted into a motor and driven from the battery so that the driving motor or engine of the generator may be started or placed under its initial compression so that the same may pick up its own cycle of operation.

It is also my purpose to provide an automatic switch or circuit breaker which will be automatic in action and located in the charging circuit and by means of which the proper flow of current to the circuit from the source of energy will be at all times assured, the circuit breaker or switch being constructed in such manner as to be readily and conveniently installed in a charging circuit and operating to automatically break the circuit in the event that the current through the charging circuit is reversed incident to overcharging of the battery and the like.

Furthermore, I aim to provide a system of the type set forth which will embrace the desired features of simplicity, efficiency, durability and convenience and which may be installed and maintained at a minimum cost and readily and conveniently manipulated.

With the above and other objects in view, the invention consists in the construction, combination and arrangement of parts hereinafter set forth in and falling within the scope of the claim.

In the accompanying drawings: Figure 1 is a diagrammatic view of a battery charging system constructed in accordance with the present invention. Fig. 2 is a view in side elevation of the automatic circuit breaker or charging switch. Fig. 3 is a sectional view therethrough.

Referring now to the accompanying drawings in detail, the numeral 1 designates a dynamo electric machine or generator of any suitable construction and adapted to be driven from an internal combustion engine indicated conventionally at 2. Some suitable form of clutch mechanism is preferably employed between the generator and the engine so that the generator may be coupled up with and uncoupled from the engine.

The numeral 3 designates an automatic circuit breaker or charging switch connected in circuit with the dynamo 1 by means of a lead wire 4 leading from one side of the generator and terminating in a binding post 5. The automatic circuit breaker 3 is, in the present instance, in the form of a polarized relay composed of electromagnets 6, 6 wound in relatively opposite directions so that when the current is flowing in one direction, the magnet to the right of Fig. 2 will have a south pole, while the magnet to the left will have a north pole, while when the direction of the flow of the current changes, the polarity of the magnets will be reversed.

The numeral 6' designates a magnetized armature of substantially U-shape and having the extremities of the limbs thereof forming permanent north and south poles. The upwardly extending limbs of the U-shaped armature, that is the pole pieces of such armature, are formed with axially alining preferably rectangular openings 6" and through these openings is passed a bar 7' secured to the armature through the medium of a fastening screw 7" passed through an aperture in the interconnecting member of the U-shaped armature and threadedly engaging the bar 7' so that the armature may be elevated and lowered with respect to the poles of the magnets. One end of the bar or lever 7' is fulcrumed upon a stud 8, while the opposite end thereof carries a contact 9' adapted to engage the contact 10' connected to the free terminal of the windings of the magnets, the other terminal of the windings of such magnets being tapped onto the binding post 5. Tapped onto the pivoted end of the lever 7' is a conductor 12 forming in effect a continuation of the lead wire 4 and terminating in the central contact 13 of one side of a triple pole double throw switch 14, while connected to the opposite side of the generator 1 is a lead wire 15 terminating in one end contact 16 of the switch 14 at the side of such switch with the contact 13, that is to say, at the left of the switch blade. Leading from the center pivot contact of the switch 14 is a conductor 17 terminating in one pivot contact of a double pole double throw charging switch 18, while from one end pivot contact of the switch 14 leads a conductor 19 terminally connected to the remaining pivot contact of the switch 18 and to one side of the switch 18 are connected conductors 20, 20 connected to the opposite sides of a storage battery or accumulator 21, while the opposite side of the double pole double throw switch 18 is in the form of jacks or sockets 22 whereby another secondary or storage battery may be charged subsequent to the charging of the accumulator 21.

When it is desired to charge the storage battery 21, the blades of the switch 14 are thrown to the left and so establish electrical communication between the conductors 12 and 17 and 15 and 19, while the double pole double throw switch 18 is thrown to the right so as to place the conductors 17 and 19 in electrical communication with the conductors 20, 20. Assuming the generator to be in operation, the lever 8 is swung in an upward direction manually thereby closing the circuit at the contact 11. Current now flows from the generator through the lead wire 4, windings of the magnets 6, 6, contact 11, the respective portion of the lever 8, the conductor 12, conductors 17 and 20, through the accumulator, the storage battery 21 and thence back to the opposite side of the generator by way of the conductors 20, 19 and 15. As long as the current from the generator flows in the proper direction, the polarized relay will hold the circuit closed at the contact 10', while when the direction of current is reversed, the poles of the magnets 6, 6 will be reversed and so present like poles to the poles of the armature 6' thereby releasing the lever or bar 7' and permitting the latter to gravitate to its lowered position so as to break the circuit.

Connected in multiple with the generator or dynamo is a pair of conductors 23 terminating in one side of the double pole double throw switch 24, while multipled to the storage battery or accumulator 21 is a pair of conductors 25 terminating in the opposite side of the switch 24, the pivot studs of the blades of the switch 24 being connected by way of conductors 26 with a voltmeter 27. Thus, by means of the switch 24 the voltmeter may be electrically connected with the generator or the storage battery, according to the manipulation of the blades of the switch thereby enabling the voltage of the generator and accumulator to be determined. An ammeter 28 is preferably connected in series with the conductor 19.

From two of the contacts at the right-hand side of the blades of the triple pole switch lead electric light feeders 29, which, when the blades of this triple pole switch are thrown to the right are in electrical communication with the storage battery 21 by way of the conductors 20, 20, the switch 18, the conductors 17, 19 and the blades of the triple pole switch. Thus, the lamps connected in the feeders may be supplied with energy from the accumulator 21. In order that the lamps connected in circuit with the feeders 29 may be supplied with energy during the charging of the accumulator 21 and receive such energy from the generator 1, I tap onto the accumulator a conductor 30 having the free terminal thereof fastened to the remaining contact 31 at the left-hand side of the triple pole double throw switch 14, while the top pivot contact of the switch blades and the center contact at the right of the blades are bridged by means of a section of wire 31', the lower contact to the right of the blades of the switch 14 and the lower pivot contact of the blades being bridged by means of a link 32. Thus, it will be seen that when the blades of the triple pole double throw switch 14 are thrown to the left, the generator 1 will be placed in electrical communication with the accumulator 21 so as to charge the latter, as previously described, while should one or more of the lights connected with the feeders 29 be turned on, current will flow from one side of the generator into the particular side of the accumulator, thence through the conductor 30, respective blade of the switch 14, wire 31', the respective feeder 29 and thence back to the other side of the generator by way of the remaining feeder 29, the link 32, the respective blade of the switch 14, and the conductor 15.

In some instances, it may be desired to run the generator as a motor so that the internal combustion engine driving the generator may be placed under initial compression so as to pick up its own cycle of operation. For this purpose the blades of the switch 14 are thrown to the left and the lever 8 swung upwardly manually and held in its elevated position thereby enabling the current to flow from the accumulator 21 into the generator and operate the latter as a motor.

From the foregoing description taken in connection with the accompanying drawings, the construction, mode of operation and manner of employing my invention will be readily apparent.

It will be seen that I have provided a storage battery charging system by means of which the lamps in a lighting circuit may be illuminated and whereby the engine may be placed under initial compression. By means of the contacts 22, 22 of the double pole double throw switch 18, an accumulator, other than that indicated at 21, may be charged, as will be readily understood by those skilled in the art to which the invention appertains. It will be observed that the automatic circuit breaker 3 acts as a safety device so that in the event of a reversal in the current flow, the connections between the generator and storage battery will be broken or disrupted.

While I have herein shown and described one preferred form of my invention by way of illustration, I desire to have it understood that I do not limit or confine myself to the precise details of construction herein described and delineated, as modification and variation may be made within the scope of the claim without departing from the spirit of the invention.

I claim:

In a system of the class described, an electric generator, a storage battery, electric light feeders and a three pole double switch having certain of its poles interconnected independently of the blades, whereby in one position the light feeders and generator will be connected to said battery and when in its other position, the generator will be cut out.

In testimony whereof I affix my signature in presence of two witnesses.

FRED E. FANNING.

Witnesses:
S. O. FRANKENBERGER,
C. A. LEATHERMAN.